C. S. SHARP.
HARROW.
APPLICATION FILED AUG. 29, 1913. RENEWED JAN. 24, 1919.
1,310,582.
Patented July 22, 1919.
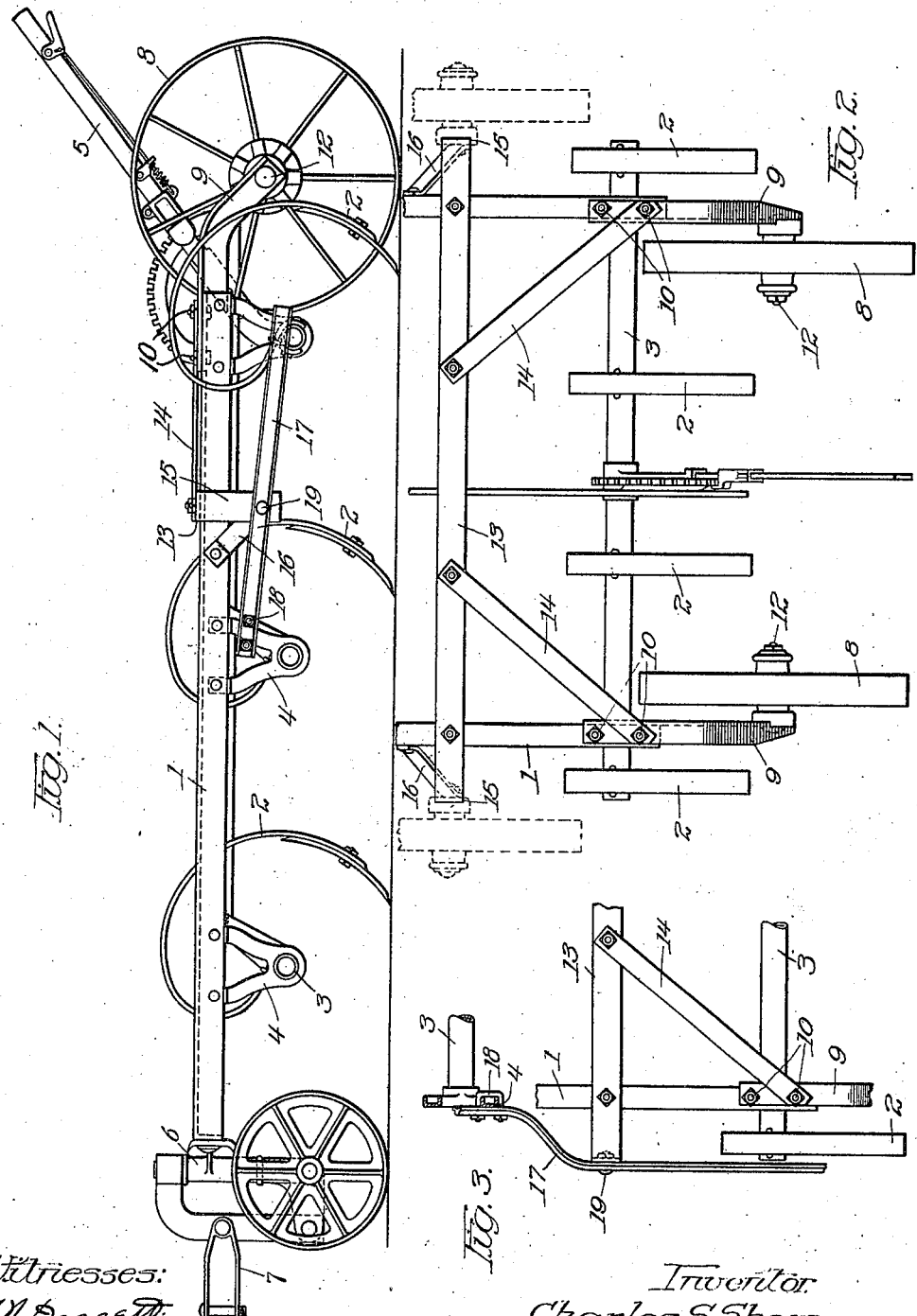
Witnesses:
Inventor
Charles S. Sharp.

UNITED STATES PATENT OFFICE.

CHARLES S. SHARP, OF AUBURN, NEW YORK, ASSIGNOR, BY MESNE ASSIGNMENTS, TO INTERNATIONAL HARVESTER COMPANY, A CORPORATION OF NEW JERSEY.

HARROW.

1,310,582. Specification of Letters Patent. Patented July 22, 1919.

Application filed August 29, 1918, Serial No. 787,367. Renewed January 24, 1919. Serial No. 272,973.

*To all whom it may concern:*

Be it known that I, CHARLES S. SHARP, a citizen of the United States, residing at Auburn, in the county of Cayuga and State of New York, have invented certain new and useful Improvements in Harrows, of which the following is a full, clear, and exact specification.

My invention relates to harrows.

It has for its object to improve the frame and transport truck of a harrow in such a manner that the harrow is enabled to pass closer to the edge of a field, or to the plants to be tilled, without injury to the fencing, harrow or the plants. I attain this object by mounting the transport wheels upon the harrow frame in an improved manner whereby stakes or vines are prevented from engaging with the wheels or outside harrow teeth, the rear wheels being carried inside the outside teeth and shields or guards being provided at the sides of the machine to protect these outside teeth.

In the accompanying drawings I have illustrated one embodiment which my invention may assume in practice.

Figure 1 is a side elevation of the harrow.

Fig. 2 is a top plan view of the harrow with the transport wheels at the rear thereof and also shown in dotted lines in their position at the side of the harrow frame.

Fig. 3 is a detail view showing one of the shields in position.

In the construction shown I have illustrated a harrow of the spring toothed type comprising a horizontally disposed U-shaped frame 1 carrying a plurality of spring teeth 2 fixed to rotatable transversely extending rods 3 journaled in depending brackets 4 and adjustable by means of a lever 5 in a well known manner; the frame being supported at its front end by a forecarriage 6 equipped with any suitable draft connections 7 and supported at its rear end by a plurality of spaced transport wheels 8.

As shown in Figs. 1 and 2, the rearwardly protruding ends of the U-shaped frame member 1 inclose the two front series of teeth 2 and pass inside the rear set of teeth. Attached to these frame members are extensions 9 preferably formed of angle material and bolted to the members 1 by means of bolts 10, although they may be formed integral with the members 1 if desired. The rear ends of these extensions are bent downward at an angle of substantially 45° and carry bearing members through which extend horizontally disposed transversely extending axle members 12 on which the wheels 8 are rotatably mounted. As shown in Fig. 2, a horizontally disposed bar 13, extending transversely across the top of the frame 1 and secured thereto, serves to strengthen the same, suitable horizontally disposed brackets 14 being provided on the top of the frame to increase the rigidity of the structure. This bar extends beyond the side members of the frame 1 and across the latter at a point in front of the rear teeth 2. As shown, it is provided with downwardly extending arms 15 at its ends bent substantially at right angles to its body portion, which are likewise braced with respect to the main frame by short vertically disposed braces 16, the braces and bars 13 each being drilled with holes of sufficient diameter to receive the axle members 12. Obviously, when desired the wheels 8 may be removed from the extensions 9 at the rear of the frame and attached to the ends of the bar 13 at the side of the frame, or vice versa, by a simple adjustment of the attaching means, the axle members 12 serving to secure the wheels to the frame and also acting, when attached to the bar 13, to clamp the bar 13 and braces 16 together.

In order that when the wheels 8 are attached at the rear of the frame and inside the rear teeth 2, as shown in full lines in Figs. 1 and 2, the vines and trash may not catch in the two teeth 2 outside the frame, I have provided for each an improved shield or guard 17 which is adapted to be bolted by means of a U-bolt 18 to one of the arms of the middle depending bracket 4. This shield extends outwardly, rearwardly and downwardly from a point adjacent its point of connection by the U-bolt 18, and is also fixed to the frame intermediate its ends by means of a suitable bolt 19, which at the same time acts to clamp the downwardly extending arms 13 to their braces 16. As shown in Figs. 1 and 3, the rear ends of these shields 17 extend directly rearwardly and downwardly from the bolts 19 outside the outside teeth 2 and close to the latter, the outwardly bent portion of the shields being between the bolts 19 and the U-bolt 18 so that when the cultivator strikes any vines, stakes, or the like, the latter are deflected to one side of the outside teeth and any trash is prevented from trailing behind the harrow in such a manner as to interfere with its work.

It is to be noted that in the construction shown herein, the operator is enabled to till the ground very close to the edge of the field, the transport wheels being carried at the rear of the frame in such a manner that they cannot engage with stakes, fencing or vines, while the shields or guards prevent stakes and the like from being caught by the harrow frame at a point inside the outside teeth. Instead the harrow is diverted by the blow being taken upon the bent surface of the guard, with the result that no damage is done. Likewise, when used in trailing vines the outside teeth are permitted to work the ground close under the vines, while the latter are deflected from the tooth by the guard. Attention is further directed to the fact that the construction is exceedingly rugged and simple and of a type which may be readily and cheaply manufactured.

While I have in this application described one embodiment which my invention may assume in practice, it is, of course, to be understood that the form shown herein for purposes of illustration may be modified without departing from the spirit of my invention.

What I claim as my invention and desire to secure by Letters Patent is:

1. In combination, a harrow frame having laterally disposed downwardly extending arms and rearwardly disposed side members, harrow teeth carried on said frame at points outside of said rearwardly extending side members and inside and rearwardly of said laterally extending arms, and means for attaching transport wheels to either said rearwardly or laterally extending elements.

2. In combination, a wheeled harrow frame, harrow teeth carried thereon, certain of said teeth being outside of said frame, a transverse supplemental frame member having downwardly extending ends projecting beyond said outside teeth, and rearwardly and downwardly extending shields rigidly attached to said frame at a point in front of said transverse member and to said transverse member, projecting rearwardly in a plane substantially parallel to the plane of said outside teeth.

3. In combination, a substantially U-shaped harrow frame having rearwardly extending arms, a transversely disposed brace carried on said frame and connected to the arms thereof, said brace having depending portions at its opposite ends, supplemental frame braces bracing said depending portions, supplemental frame braces rigidly attached to the arms of said frame and to said transversely extending member, and wheels rotatable on either the arms of said frame or said transversely extending member.

4. In combination, a substantially U-shaped harrow frame, harrow teeth, carried by said frame, certain of said teeth being supported outside said frame, rearwardly and downwardly extending arms fixed to the rear ends of the arms of said U-shaped frame inside said outside teeth, transport wheels rotatably mounted on the depending ends of said arms, a transversely disposed supplemental frame member rigidly attached to the frame and protruding beyond said outside teeth at a point in front of the same, and rearwardly and downwardly disposed shields rigidly attached to said transverse frame member having converging front ends and rearwardly extending parallel ends disposed in a plane substantially parallel to the plane of said outside teeth and outside the same.

In testimony whereof I affix my signature, in the presence of two witnesses.

CHARLES S. SHARP.

Witnesses:
H. J. McMahon,
Robert K. Forth.

Copies of this patent may be obtained for five cents each, by addressing the "Commissioner of Patents, Washington, D. C."